(12) United States Patent
Nakayama et al.

(10) Patent No.: US 7,631,899 B2
(45) Date of Patent: Dec. 15, 2009

(54) SEAT BELT APPARATUS

(75) Inventors: Tadahiro Nakayama, Hikone (JP);
Hiroshi Tomita, Omihachiman (JP);
Yoshiyuki Nakano, Hikone (JP)

(73) Assignee: Takata Corporation, Tokyo (JP)

( * ) Notice: Subject to any disclaimer, the term of this patent is extended or adjusted under 35 U.S.C. 154(b) by 481 days.

(21) Appl. No.: 11/034,889

(22) Filed: Jan. 14, 2005

(65) Prior Publication Data

US 2005/0151365 A1 Jul. 14, 2005

Related U.S. Application Data

(63) Continuation-in-part of application No. 10/064,054, filed on Jun. 5, 2002, now Pat. No. 6,874,817.

(30) Foreign Application Priority Data

| Jan. 14, 2004 | (JP) | ............................ 2004-006451 |
| Sep. 24, 2004 | (JP) | ............................ 2004-276636 |

(51) Int. Cl.
*B60R 22/28* (2006.01)
(52) U.S. Cl. ...................................... 280/805; 280/807
(58) Field of Classification Search ................. 280/805, 280/807
See application file for complete search history.

(56) References Cited

U.S. PATENT DOCUMENTS

| 5,411,291 A | 5/1995 | Foehl |
| 5,450,723 A | 9/1995 | Foehl |
| 5,944,350 A * | 8/1999 | Grabowski et al. .......... 280/806 |
| H1833 H * | 2/2000 | Hoppel et al. .............. 296/68.1 |
| 6,095,615 A | 8/2000 | Wier |
| 6,131,951 A | 10/2000 | Chicken et al. |
| 6,213,513 B1 * | 4/2001 | Grabowski et al. .......... 280/806 |
| 6,250,720 B1 | 6/2001 | Wier |
| 6,312,057 B1 * | 11/2001 | Feile .......................... 297/471 |
| 6,851,715 B2 * | 2/2005 | Devereaux et al. .......... 280/806 |
| 7,232,155 B2 * | 6/2007 | Nishizawa ................... 280/805 |
| 2002/0185852 A1 * | 12/2002 | Nakano et al. .............. 280/806 |
| 2003/0030264 A1 * | 2/2003 | Motozawa ................... 280/806 |
| 2003/0189331 A1 * | 10/2003 | Heckmayr ................... 280/807 |
| 2004/0041390 A1 * | 3/2004 | Tomita ....................... 280/806 |
| 2004/0212188 A1 * | 10/2004 | Terasaki ..................... 280/806 |

FOREIGN PATENT DOCUMENTS

| EP | 1 266 808 A1 | 12/2002 |
| JP | 5-62363 | 8/1993 |
| JP | 7-223503 | 8/1995 |
| JP | 7-251707 | 10/1995 |
| JP | 8-324384 | 12/1996 |
| JP | 3308348 | 5/2002 |

* cited by examiner

*Primary Examiner*—Paul N. Dickson
*Assistant Examiner*—Barry Gooden, Jr.
(74) *Attorney, Agent, or Firm*—Foley & Lardner LLP

(57) ABSTRACT

A kinetic-energy absorbing member absorbs the kinetic energy of a pull-in member such as a buckle or a lap anchor when reaching a bottom position. The kinetic-energy absorbing member, which includes a thin-walled tubular member that may be made of metal such as iron or aluminum, is arranged between a bracket and buckle. As the pretensioner is actuated, the buckle is pulled by a wire, thereby depressing the kinetic-energy absorbing member against the bracket so that the kinetic-energy absorbing member collapses and the kinetic energy of the buckle is absorbed when reaching the bottom position.

15 Claims, 3 Drawing Sheets

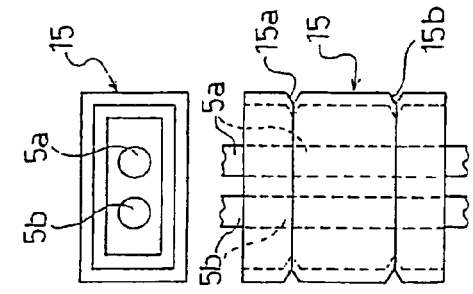
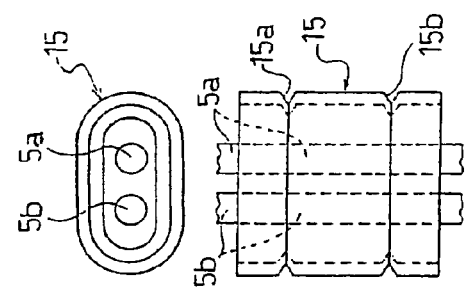
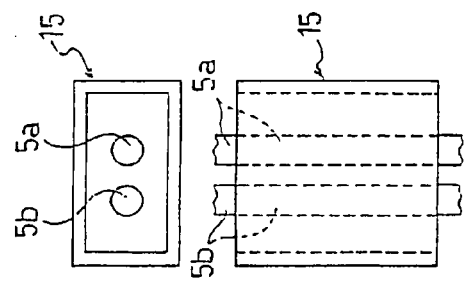
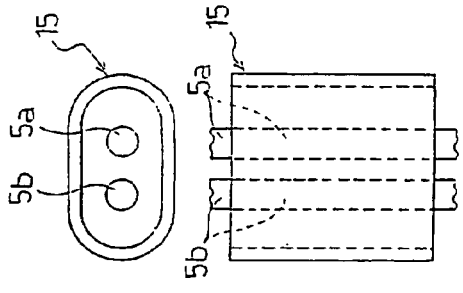
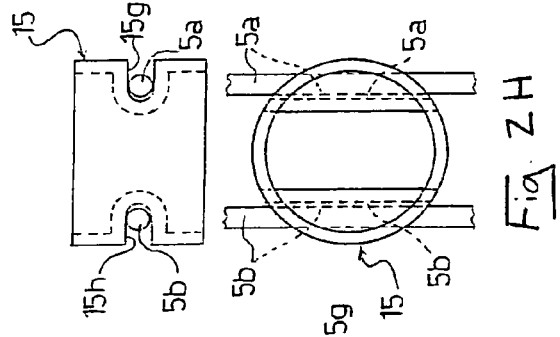
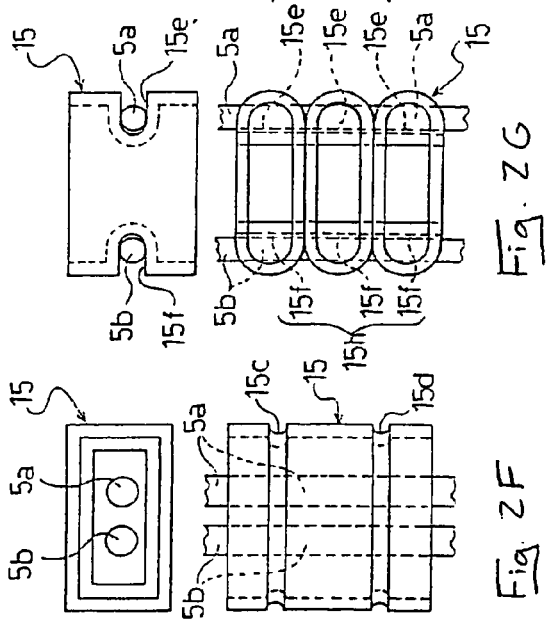
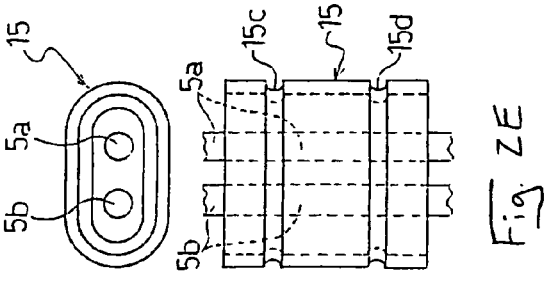

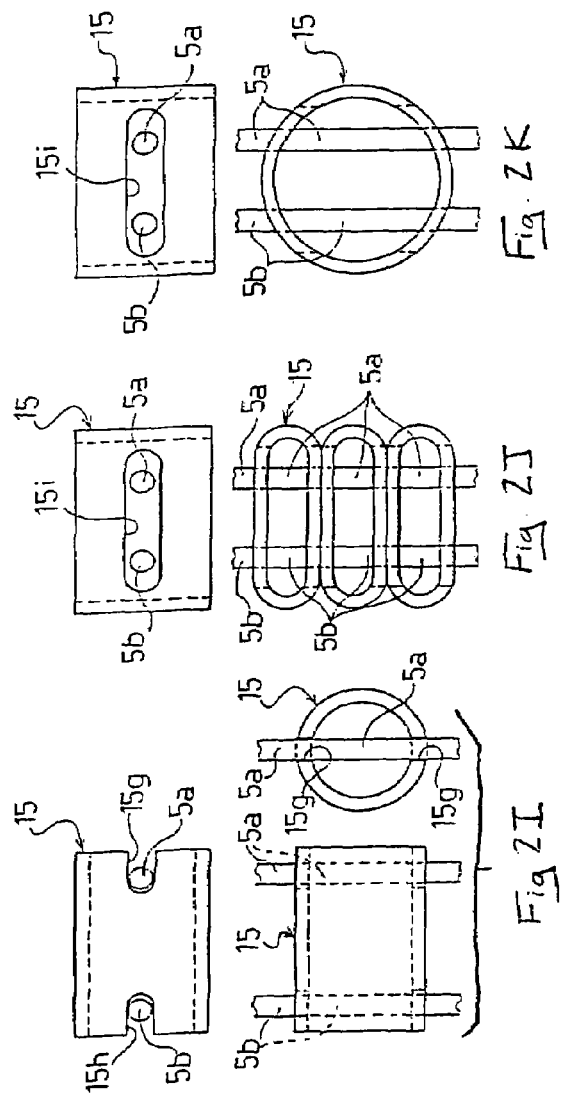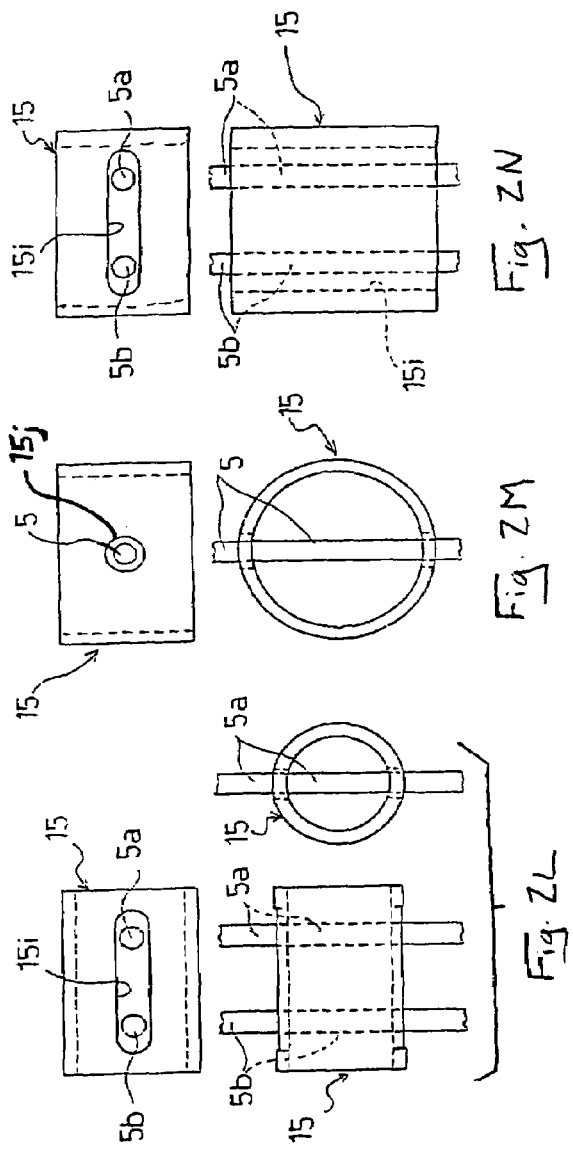

SEAT BELT APPARATUS

This application is a continuation-in-part of U.S. application Ser. No. 10/064,054, filed Jun. 5, 2002 (now U.S. Pat. No. 6,874,817).

BACKGROUND

The present invention relates to a seat belt apparatus installed in a seat of a vehicle such as an automobile. In particular, the present invention relates to a seat belt apparatus in which a pretensioner is actuated to tension a seat belt in the event of emergency situation such as a vehicle collision, so as to provide an enhanced restraining function.

Conventionally, seats of vehicles such as automobiles are equipped with seat belt apparatuses that restrain occupants to prevent the occupants from inertial movement when an extremely large deceleration is exerted in an emergency event such as, for example, a vehicle collision. The occupants are restrained during the emergency event even for purposes of protection. Some seat belt apparatuses are equipped with a pretensioner that tensions the associated seat belt during an emergency event so as to enhance the restraining function, whereby the occupant is rapidly restrained with a large restraining force(s). These conventional pretensioners are normally installed in the seat belt retractors of the seat belt apparatuses. However, some pretensioners are installed in a buckle such as, for example, that which is disclosed in Japanese Patent Unexamined Publication No. 2003-54360, which is enclosed herein by reference in its entirety.

In a seat belt apparatus equipped with a buckle pretensioner, such as that disclosed in Japanese Patent Unexamined Publication No. 2003-54360, the pretensioner is actuated to pull the buckle during an emergency event, thereby tensioning the seat belt. In this case, the seat belt apparatus is provided with a kinetic-energy absorbing member with which the buckle comes into contact when the buckle is completely pulled downward to a bottom position.

With respect to the kinetic-energy absorbing members disclosed in Japanese Patent Unexamined Publication No. 2003-54360, one has a complex shape, one requires a relatively complicated process of forming a guide groove or guide hole for a wire pulling the buckle, and one is produced from different parts. Unfortunately, the kinetic-energy absorbing member having a complex shape and the kinetic-energy absorbing member requiring the complicated process are produced from rubber (or resin having properties similar to that of rubber) and, therefore, the manufacturing cost of these kinetic-energy absorbing members is high. Similarly, the kinetic-energy absorbing member that is produced from different parts requires a more complicated manufacturing procedure that, in turn, also mandates high manufacturing costs.

Accordingly, the present invention has been made in light of the aforementioned problems. An object of the present invention is to provide a seat belt apparatus that: (a) includes a kinetic-energy absorbing member that absorbs kinetic energy when a pull-in member, such as, e.g., a buckle or a lap anchor, is completely pulled to a bottom position; and (b) has a simple shape; and (c) may be manufactured at a lower cost than conventional kinetic-energy absorbing members.

SUMMARY

An embodiment of the invention, addresses a seat belt apparatus that includes, among other possible things: a seat belt; a pull-in member; at least one pretensioner for pulling the pull-in member to tension the seat belt during an emergency event, and a metallic and tubular kinetic-energy absorbing member that is configured to absorb the kinetic energy of the pull-in member when the pull-in member reaches a bottom position.

In a further embodiment of the seat belt apparatus, the seat belt apparatus may also include a peripheral member provided around the pull-in member. The peripheral member may be influenced by the pulling of the pull-in member. The kinetic energy of the peripheral member around the pull-in member (which is influenced by the pulling operation of the pull-in member) may also be reduced by the kinetic energy of the pull-in member when the bottom position is reached.

In another further embodiment of the seat belt apparatus, the metallic and tubular kinetic-energy absorbing member may be composed of iron or aluminum. As iron or aluminum may be used as the metal, an existing iron pipe or aluminum pipe can be employed, thereby further reducing the manufacturing costs of the kinetic-energy absorbing member.

In another further embodiment of the seat belt apparatus, the pull-in member may be a buckle. Similarly, in another further embodiment of the seat belt apparatus, the pull-in member may be a lap anchor. The kinetic energy of the buckle and/or the lap anchor when reaching the bottom position may be absorbed and, therefore, the buckle and/or the lap anchor may reach the bottom position (i.e., stop) more effectively and more gently.

In another further embodiment of the seat belt apparatus, the tubular kinetic-energy absorbing member may have a substantially oval or circular cross-section. Further, the tubular kinetic-energy absorbing member may have one or more V-like grooves formed in a circumferential direction thereof. Or, the tubular kinetic-energy absorbing member may have one or more U-like grooves formed in a circumferential direction thereof.

In another further embodiment of the seat belt apparatus, the tubular kinetic-energy absorbing member may have a substantially rectangular cross-section. Further, the tubular kinetic-energy absorbing member may have one or more V-like grooves formed in a circumferential direction thereof. Or, the tubular kinetic-energy absorbing member may have one or more U-like grooves formed in a circumferential direction thereof.

In another further embodiment of the seat belt apparatus, an axis of the tubular kinetic-energy absorbing member may be perpendicular to a direction in which the pull-in member is pulled.

In another further embodiment of the seat belt apparatus, the tubular kinetic-energy absorbing member may have two U-like grooves formed in a radial direction thereof. Further, one of the U-like grooves may be through a first end of the tubular kinetic-energy absorbing member and the other of the U-like grooves may be through a second end of the tubular kinetic-energy absorbing member. In some embodiments, the U-like grooves may be normal to the axis of the tubular kinetic-energy absorbing member. In other embodiments, the U-like grooves may not be normal to the axis of the tubular kinetic-energy absorbing member.

In another further embodiment of the seat belt apparatus, the tubular kinetic-energy absorbing member may include two or more tubular elements. Further, axes of the tubular elements may be perpendicular to the direction in which the pull-in member is pulled.

In another further embodiment of the seat belt apparatus, the tubular kinetic-energy absorbing member may include a guide hole formed therethrough.

In another further embodiment of the seat belt apparatus, the seat belt apparatus may also include one or more wires that are configured to pull the pull-in member. Further, portions of the one or more wires may pass through the tubular kinetic-energy absorbing member and may be parallel to the direction in which the pull-in member is pulled. In addition, the portions of the one or more wires may be normal to the axis of the tubular kinetic-energy absorbing member. Or, the portions of the one or more wires may not be normal to the axis of the tubular kinetic-energy absorbing member.

In another further embodiment of the seat belt apparatus, only one wire may be provided through the tubular kinetic-energy absorbing member.

In another further embodiment of the seat belt apparatus, two or more wires may be provided through the tubular kinetic-energy absorbing member.

Another embodiment of the invention addresses a seat belt apparatus that includes, among other possible things: a seat belt; a pull-in member; at least one pretensioner for pulling the pull-in member to tension the seat belt during an emergency event, and a tubular kinetic-energy absorbing member that is configured to absorb the kinetic energy of the pull-in member when the pull-in member reaches a bottom position. The tubular kinetic-energy absorbing member has one or more U-like grooves or V-like grooves formed in a circumferential direction thereof.

Another embodiment of the invention addresses a seat belt apparatus that includes, among other possible things: a seat belt; a pull-in member; at least one pretensioner for pulling the pull-in member to tension the seat belt during an emergency event, and a tubular kinetic-energy absorbing member that is configured to absorb the kinetic energy of the pull-in member when the pull-in member reaches a bottom position. An axis of the tubular kinetic-energy absorbing member is perpendicular to a direction in which the pull-in member is pulled.

Another embodiment of the invention addresses a seat belt apparatus that includes, among other possible things: a seat belt; a tongue connected to the seat belt; a buckle configured to engage the tongue releaseably; a pull-in member connected to the buckle; at least one pretensioner for pulling the pull-in member to tension the seat belt during an emergency event, and a metallic and tubular kinetic-energy absorbing member that is configured to absorb the kinetic energy of the pull-in member when the pull-in member reaches a bottom position.

Another embodiment of the invention addresses a seat belt apparatus that includes, among other possible things: a seat belt; a tongue connected to the seat belt; a buckle configured to engage the tongue releaseably; a pull-in member; at least one pretensioner for pulling the pull-in member to tension the seat belt during an emergency event, and a tubular kinetic-energy absorbing member that is configured to absorb the kinetic energy of the pull-in member when the pull-in member reaches a bottom position. The tubular kinetic-energy absorbing member has one or more U-like or V-like grooves formed in a circumferential direction thereof.

Another embodiment of the invention addresses a seat belt apparatus that includes, among other possible things: a seat belt; a tongue connected to the seat belt; a buckle configured to engage the tongue releaseably; a pull-in member; at least one pretensioner for pulling the pull-in member to tension the seat belt during an emergency event, and a tubular kinetic-energy absorbing member that is configured to absorb the kinetic energy of the pull-in member when the pull-in member reaches a bottom position. An axis of the tubular kinetic-energy absorbing member is perpendicular to a direction in which the pull-in member is pulled.

Another embodiment of the invention addresses a vehicle that includes, among other possible things: a seat; and a seat belt apparatus configured to restrain an occupant sitting on the seat during an emergency event. The seat belt apparatus includes, among other possible things: a seat belt; a pull-in member; at least one pretensioner for pulling the pull-in member to tension the seat belt during an emergency event, and a metallic and tubular kinetic-energy absorbing member that is configured to absorb the kinetic energy of the pull-in member when the pull-in member reaches a bottom position.

According to previously described seat belt apparatus embodiments, the pull-in member may be pulled by the operation of the pretensioner during an emergency. Then, the pull-in member may come into contact with the kinetic-energy absorbing member and the kinetic energy of the pull-in member, when reaching the bottom position, may be absorbed by the kinetic-energy absorbing member. Therefore, the pull-in member may gently reach the bottom (i.e., stop).

As the kinetic-energy absorbing member of the present invention is composed of a tubular member of a simple shape made of metal, the kinetic-energy absorbing means may be manufactured easily and at low cost.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 2A-2N are illustrations schematically showing various examples of kinetic-energy absorbing member embodiments to be used in the pretensioner of FIG. 1, each figure shows a front view below an end view of a kinetic-energy absorbing member embodiment; FIGS. 2I and 2L also provide a side view.

DETAILED DESCRIPTION

Figure 1:
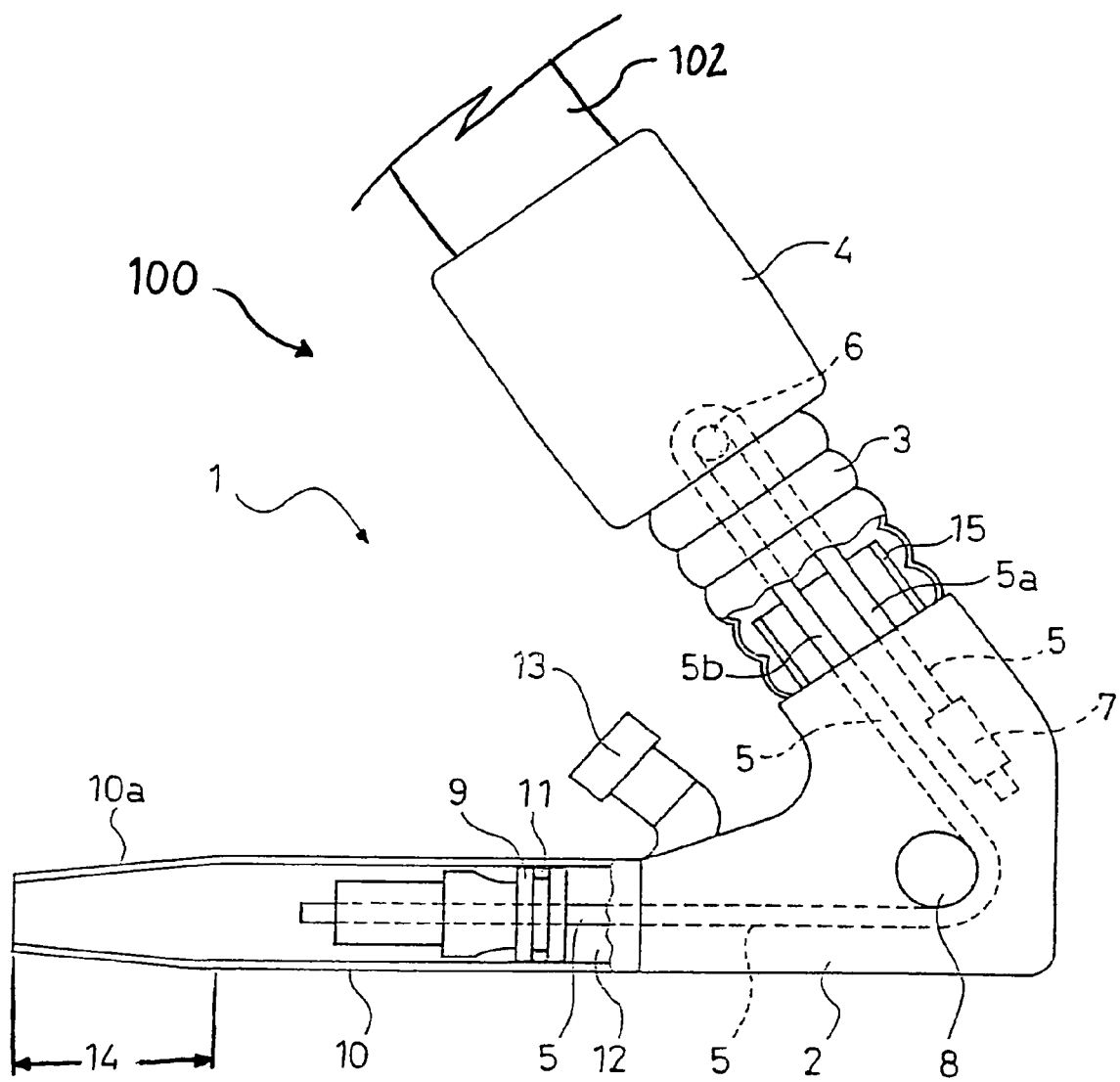
FIG. 1 is a partial cutaway view schematically showing a pretensioner used in an embodiment of a seat belt apparatus according to the present invention.

Embodiments of the present invention will be described with reference to the drawings. As shown in FIG. 1, a seat belt apparatus 100 includes: (a) a buckle pretensioner 1; (b) a conventional buckle 4 (also referred to as a "pull-in member"); (c) a seat belt 102 that is configured to engage the buckle 4 (by a tongue (not shown) extending from the belt 102 that slides into a tongue insertion hole (not shown) in an upper end of the buckle 4); and (d) a bracket 2 that is connected to the buckle 4 by the pretensioner 1. Other structures of the seat belt apparatus 100 are substantially the same as those of the conventional seat belt apparatus disclosed in the aforementioned Japanese Patent Unexamined Publication No. 2003-54360.

The pretensioner 1 includes a cover (also referred to as a "peripheral member") 3 that can expand and contract in the axial direction. One end of the cover 3 is attached to the bracket 2 and the other end of the cover 3 is attached to the buckle 4. The buckle 4 is provided at its upper end with the tongue insertion opening (not shown). At the lower portion (i.e., the side opposite to the upper end) the buckle is provided with a pulley 6 onto which a wire 5 is wound. One end of the wire 5 is fixed to the bracket 2 by a fixing means 7. A first wire portion 5a of the wire 5 passes through the cover 3 and winds around the pulley 6 in the buckle 4. A second wire portion 5b of the wire 5 then extends back through the cover 3 and is subsequently wound on a pulley 8 that is rotatably fixed to the bracket 2. From the pulley 8 in the bracket 2, the wire 5 extends to a piston 9 to which it is connected.

The piston 9 is slidably housed in a cylinder 10 attached to the bracket 2. Further, the piston 9 is airtightly sealed in the housing 10 by a sealing member 11 such as, for example, an O-ring. The distal end of the cylinder 10 (i.e., the end opposite to the side that is mounted to the bracket 2) has a tapered portion 10a. The tapered portion 10a is in the shape of a truncated cone such that its internal diameter continuously decreases toward the distal end of the cylinder 10.

The cylinder 10 is provided with an internal pressure chamber 12 provided at the proximal end of the cylinder 10 (i.e., at the end opposite to the tapered portion 10a) between the bracket 2 and the piston 9. The pressure chamber 12 is in fluid communication with a gas generator 13 mounted to the bracket 2. The gas generator 13 is actuated during an emergency event to generate a high-pressure reaction gas. The gas thus generated is introduced into the pressure chamber 12 and acts on the piston 9, thereby driving the piston 9 toward the distal end of the cylinder 10 and, in turn, pulling the buckle 4 toward the bracket 2 via the wire 5.

When the piston 9 reaches the tapered portion 10a, the piston 9 plastically deforms in the tapered portion 10a. The deformation of the tapered portion 10a absorbs the kinetic energy of the piston 9. In other words, the tapered portion 10a is structured as an energy absorbing portion 14.

The seat belt apparatus of this embodiment is further provided with a kinetic-energy absorbing member 15 that is disposed in the cover 3 and is attached to the bracket 2. With respect to FIGS. 2A-2N, the "bracket-side end" of the kinetic-energy absorbing member 15 is the lower end of each front view and the "buckle-side end" of the kinetic-energy absorbing member 15 is the upper end of each front view.

In the embodiment shown in FIG. 2A, the kinetic-energy absorbing member 15 comprises an oval tubular member having thin wall. The tubular member may be made of metal such as iron or aluminum. The kinetic-energy absorbing member 15 is arranged such that the axial direction thereof (i.e., the axial direction of the tubular member) is parallel to the direction in which the buckle 4 is pulled. The bracket-side end of the kinetic-energy absorbing member 15 is fixed to the bracket 2. In contrast, the buckle-side end of the kinetic-energy absorbing member 15 is a free end (i.e., it is not connected to anything and instead is merely contained by the cover 3). As the wire 5 forms a U-turn about the pulley 6 of the buckle 4 (as previously discussed) the two wire portions 5a, 5b extend through the inside of the tubular kinetic-energy absorbing member 15.

In a non-actuated state, the buckle 4 is held at a predetermined position shown in FIG. 1. In this state, the buckle 4 is spaced apart from the kinetic-energy absorbing member 15 and the kinetic-energy absorbing member 15 is in free state. As a result of the spacing between the buckle-side end of the kinetic-energy absorbing member 15 and the buckle 4, the cover 3 is in a maximum permissible extension position.

When an emergency event occurs, the buckle pretensioner 1 may be actuated in the same manner as the conventional seat belt apparatus. The gas generator 13 generates high-pressure reaction gas and the reaction gas thus generated is introduced into the pressure chamber 12. Then, the reaction gas introduced into the pressure chamber 12 drives the piston 9 toward to the end of the cylinder 10, thereby pulling the wire 5. The movement of the wire 5 causes the buckle 4 to be pulled towards the bracket 2 (i.e., in the direction diagonally toward the right below in FIG. 1), thereby contracting the cover 3.

As the piston 9 comes into contact with the tapered portion 10a (i.e., the energy absorbing portion 14), the piston 9 continues to move to the left and plastically deforms in the tapered portion 10a. The deformation of the piston 9 in the tapered portion 10a absorbs the kinetic-energy of the piston 9.

As the buckle 4 is pulled, it comes into contact with the buckle-side end of the kinetic-energy absorbing member 15 when the piston 9 reaches the tapered portion 10a. The subsequent pulling of the buckle 4 causes the cover 3 to contract up to a maximum permissible contraction position. As a result of the bracket-side end of the kinetic-energy absorbing member 15 being connected to the bracket 2, a further downward movement of the buckle 4 depresses (i.e., collapses) and deforms the kinetic-energy absorbing member 15. The contraction and deformation of the kinetic-energy absorbing member 15 absorbs the kinetic energy of the buckle 4. Further, the kinetic energy of the piston 9 moving at high speed is absorbed by the energy absorbing portion 14 just before the buckle 4 reaches a bottom position.

As the force of the buckle 4 pressing the kinetic-energy absorbing member 15 (caused by the pulling force of the buckle pretensioner 1) becomes equal to the counter force of the kinetic-energy absorbing member 15, the downward movement of the buckle 4 is stopped, i.e., the buckle 4 reaches the bottom position. Moreover, as the gradual deformation of the kinetic-energy absorbing member 15 absorbs the kinetic-energy of the buckle 4, during the buckle 4 gently reaches the bottom position.

The absorption of kinetic energy in the seat belt apparatus 100 can be achieved with a simple structure that can be manufactured at low cost. Specifically, the kinetic-energy absorbing member 15, which absorbs the kinetic energy of the buckle 4, includes the thin-walled tubular member having a simple shape. Moreover, as the kinetic-energy absorbing member 15 may be made of metal (e.g., iron or aluminum), the kinetic-energy absorbing member 15 can be easily manufactured at low cost. In addition, as iron or aluminum may be used as the metal, an existing iron pipe or aluminum pipe can be employed, thereby reducing manufacturing costs. Or, the kinetic-energy absorbing member 15 can be easily manufactured at low cost. Similarly, the tapered portion 10a of the cylinder 10, which absorbs the kinetic energy of the piston 9, also has a simple shape and, therefore, can be similarly manufactured at low cost. Finally, it should be noted that as the kinetic energy of the buckle 4 is absorbed by the kinetic-energy absorbing member 15, the kinetic energy applied to the cover 3 is reduced.

Though the bracket-side end of the kinetic-energy absorbing member 15 is fixed to the bracket 2 in this embodiment, the bracket-side end of the kinetic-energy absorbing member 15 may not be fixed to the bracket 2 so that the both ends of the kinetic-energy absorbing member 15 may be free ends relative to the bracket 2. That is, it is only required that the kinetic-energy absorbing member 15 be arranged between the bracket 2 and the buckle 4, i.e., it does not matter whether the bracket-side end of the kinetic-energy absorbing member 15 is fixed to the bracket 2. Moreover, the bracket-side end may simply rest against the bracket 2.

In the situation in which the bracket-side end of the kinetic-energy absorbing member 15 is merely resting against the bracket 2, the position of the buckle-side end of the kinetic-energy absorbing member 15 is set at the maximum permissible contraction position of the cover 3. The same is true for the following alternate embodiments of the kinetic-energy absorbing member 15, which are described with respect to FIGS. 2B-2N.

In the embodiment shown in FIG. 2B, the kinetic-energy absorbing member 15 includes a thin-walled rectangular tubular member.

In the embodiment shown in FIG. 2C, the kinetic-energy absorbing member 15 includes a thin-walled oval tubular member similar to the embodiment of FIG. 2A, except that the tubular member of this embodiment is provided with two V-like grooves 15a, 15b respectively formed at an upper side and a lower side of the kinetic-energy absorbing member 15. The V-like grooves 15a, 15b extend in a circumferential direction to assist in contraction and deformation of the tubular member, thereby further effectively absorbing the kinetic energy of the buckle 4 when reaching the bottom position.

In the embodiment shown in FIG. 2D, the kinetic-energy absorbing member 15 includes a thin-walled rectangular tubular member similar to the embodiment of FIG. 2B, except that the tubular member of this embodiment is provided with two V-like grooves 15a, 15b, having the same function as the V-like grooves 15a, 15b in FIG. 2C. The V-like grooves 15a, 15b are respectively formed at an upper side and a lower side of the kinetic-energy absorbing member 15 and extend in a circumferential direction.

In the embodiment shown in FIG. 2E, the kinetic-energy absorbing member 15 includes a thin-walled oval tubular member similar to the embodiment of FIG. 2A. In the embodiment shown in FIG. 2F, the kinetic-energy absorbing member 15 includes a thin-walled rectangular tubular member similar to the embodiment of FIG. 2B. Unlike the corresponding embodiments of the kinetic-energy absorbing member 15 shown in FIGS. 2A and 2B, however, the tubular kinetic-energy absorbing members 15 of the embodiments shown in FIGS. 2E and 2F are each provided with U-like grooves 15c, 15d, having the same function as the V-like grooves 15a, 15b in FIGS. 2C and 2D. The U-like grooves 15c, 15d are respectively formed at an upper side and a lower side of the kinetic-energy absorbing member 15 and extend in a circumferential direction.

Similar to the embodiment shown in FIG. 2A, in each of the embodiments shown in FIGS. 2B-2F: (a) the kinetic-energy absorbing member 15 is arranged such that the axial direction thereof (i.e., the axial direction of the tubular member) is parallel to the direction in which the buckle 4 is pulled; and (b) two wire portions 5a, 5b extend through the inside of the tubular kinetic-energy absorbing member 15.

In contrast, in the embodiments shown in FIGS. 2G-2I, the wire portions 5a, 5b extend through U-like grooves form on an outer side of the kinetic-energy absorbing member 15 such that the wire portions 5a, 5b are externally accessible.

For example, in the embodiment shown in FIG. 2G, the kinetic-energy absorbing member 15 includes an oval cross-section and a thin wall similar to the embodiment of FIG. 2A. In this embodiment, however, three tubular members are stacked on each other and are bonded to each other by welding or the like. In this embodiment, the three tubular members are stacked on each other in the pulling direction such that axial directions of the three tubular members are perpendicular to the direction in which the buckle 4 is pulled. The three tubular members are each provided with concaved U-like grooves 15e, 15f formed in opposing arc portions thereof so that when the three tubular members are stacked on each other, the U-like grooves 15e, 15f form guide grooves 15g, 15h through which two wire portions 5a, 5b are inserted and guided, respectively. According to the kinetic-energy absorbing member 15 of this embodiment, the three tubular members are easier to collapse (and, therefore, absorb kinetic energy more readily) as compared to the aforementioned embodiments, in which the axial direction of the tubular member 15 is parallel to the direction in which the buckle 4 is pulled.

In the embodiment of FIG. 2H, the kinetic-energy absorbing member 15 includes a thin-walled tubular member. In this embodiment, the tubular member is arranged such that the axial direction thereof is perpendicular to the direction in which the buckle 4 is pulled. The tubular member is provided with concaved U-like grooves 15g, 15h, formed in opposing arc portions thereof, through which two wire portions 5a, 5b are inserted and guided. According to the kinetic-energy absorbing member 15 of this embodiment, the tubular member is easy to collapse and absorbs energy easily because the axial direction of the tubular member is perpendicular to the direction in which the buckle 4 is pulled.

In the embodiment of FIG. 2I, the kinetic-energy absorbing member 15 includes a thin-walled tubular member having a thin-walled circular section. In this embodiment, the tubular member is arranged such that the axial direction thereof is perpendicular to the direction in which the buckle 4 is pulled. The tubular member is provided with U-like grooves 15g, 15h, formed in opposing ends thereof, through which two wire portions 5a, 5b are inserted and guided. According to the kinetic-energy absorbing member 15 of this embodiment, the tubular member is easy to collapse and absorbs energy easily because the axial direction of the tubular member is perpendicular to the direction in which the buckle 4 is pulled.

In the embodiment shown in FIG. 2J, the kinetic-energy absorbing member 15 includes three thin-walled oval tubular members that are stacked and bonded to each other similar to the embodiment shown in FIG. 2G. In this embodiment, the kinetic-energy absorbing member 15 is not provided with the U-like grooves 15e, 15f shown in FIG. 2G. Instead, the kinetic-energy absorbing member 15 is provided with oval guide holes 15i through which the two wire portions 5a, 5b extend. The guide holes 15i are formed in the peripheral surfaces of the tubular members to extend in a direction perpendicular to the direction in which the buckle 4 is pulled. According to the kinetic-energy absorbing member 15 of this embodiment, the tubular members are easy to collapse and absorb energy easily similar to the embodiment shown in FIG. 2G.

In the embodiment shown in FIG. 2K, the kinetic-energy absorbing member 15 includes a thin-walled tubular member just like the embodiment shown in FIG. 2H. In this embodiment, the kinetic-energy absorbing member 15 is not provided with the U-like grooves 15g, 15h shown in FIG. 2H. Instead, the kinetic-energy absorbing member 15 is provided with oval guide holes 15i through which the two wire portions 5a, 5b extend. The guide holes 15i are formed in the peripheral surfaces of the tubular member to extend in a direction perpendicular to the direction in which the buckle 4 is pulled. According to the kinetic-energy absorbing member 15 of this embodiment, the tubular member is easy to collapse and absorbs energy easily similar to the embodiment shown in FIG. 2H.

In the embodiment shown in FIG. 2L, the kinetic-energy absorbing member 15 includes a thin-walled tubular member just like the embodiment shown in FIG. 2I. In this embodiment, the kinetic-energy absorbing member 15 is not provided with the U-like grooves 15g, 15h shown in FIG. 2I. Instead, the kinetic-energy absorbing member 15 is provided with oval guide holes 15i through which the two wire portions 5a, 5b extend. The guide holes 15i are formed in the peripheral surfaces of the tubular member to extend in a direction perpendicular to the direction in which the buckle 4 is pulled. According to the kinetic-energy absorbing member 15 of this embodiment, the tubular member is easy to collapse and absorbs energy easily similar to the embodiment shown in FIG. 2I.

In the embodiment shown in FIG. 2M, the kinetic-energy absorbing member 15 includes a thin-walled tubular member just like the embodiment shown in FIG. 2K. In this embodiment, the kinetic-energy absorbing member 15 is provided with circular guide holes 15j through which a wire portion of the wire 5 extends. In the kinetic-energy absorbing member 15 of this embodiment, the wire 5 extending from a pulley 8 of the bracket 2 to the buckle 4 is directly connected to the buckle 4 without forming a U-turn at the pulley 6 of the buckle 4 like the embodiment shown in FIG. 1. Therefore, only one wire portion S extends through the circular guide holes 15j. According to the kinetic-energy absorbing member 15 of this embodiment, the tubular member is easy to collapse and absorbs energy easily similar to the embodiment shown in FIG. 2K.

In the embodiment shown in FIG. 2N, the kinetic-energy absorbing member 15 includes a thick-walled rectangular tubular member that is provided with guide holes 15i having an oval section formed therein. The tubular member is arranged such that the axial direction thereof is parallel to the direction in which the buckle 4 is pulled, similar to the embodiment of FIG. 2B.

The kinetic-energy absorbing member 15 of any of the embodiments shown in FIGS. 2B-2N may be made of metal such as iron or aluminum, similar to the embodiment of FIG. 2A.

Although the energy absorbing portion 14 (composed of the tapered portion 10a of the cylinder 10) may be provided in conjunction with any of the aforementioned kinetic-energy absorbing member 15 embodiments to form a seat belt apparatus 100, the present invention does not necessarily require the energy absorbing portion 14 and, therefore, the energy absorbing portion 14 may be omitted.

Although, in any of the aforementioned embodiments, the pretensioner 1 used for the seat belt apparatus 100 of the present invention has been described as being a buckle pretensioner used to pretension the buckle 4, the pretensioner of the seat belt apparatus of the present invention may be applied as a pretensioner used to pretension a lap anchor.

The pretensioner used for the seat belt apparatus of the present invention is a pretensioner that is part of a seat belt apparatus installed in a vehicle such as automobile. The pretensioner is actuated during an emergency event (e.g., a vehicle collision) to tension a seat belt so as to provide improved occupant restraint. Accordingly, the pretensioner may suitably be used to pull a buckle or a lap anchor, thereby tensioning the seat belt.

The priority applications, Japanese Application No. 2004-006451 (which was filed Jan. 14, 2004) and Japanese Application No. 2004-276636 (which was filed on Sep. 24, 2004) are incorporated herein by reference in their entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt apparatus comprising:
   a seat belt;
   a pull-in member;
   at least one pretensioner for pulling the pull-in member to tension the seat belt during an emergency event, and
   a metallic and tubular kinetic-energy absorbing member that is configured to absorb kinetic energy of the pull-in member when the pull-in member reaches a bottom position,
   wherein the tubular kinetic-energy absorbing member comprises a tubular element having two ends and an outer peripheral wall of constant thickness around a passage of constant area along a longitudinal direction of the kinetic-energy absorbing member when in an undeformed state,
   wherein the outer peripheral wall of constant thickness is a wall thin enough to gradually depress and deform when absorbing the kinetic-energy of the pull-in member in a deformed state; and
   wherein both ends of the absorbing member are free and not fixed.

2. The seat belt apparatus according to claim 1, further comprising: a peripheral member provided around the pull-in member, wherein the peripheral member is influenced by the pulling of the pull-in member.

3. The seat belt apparatus according to claim 1, wherein the metallic and tubular kinetic-energy absorbing member is composed of iron or aluminum.

4. The seat belt apparatus according to claim 1, wherein the pull-in member is a buckle.

5. The seat belt apparatus according to claim 1, wherein the pull-in member is a lap anchor.

6. The seat belt apparatus according to claim 1, wherein the tubular kinetic-energy absorbing member has a substantially oval or circular cross-section.

7. The seat belt apparatus according to claim 1, further comprising: one or more wires that are configured to pull the pull-in member.

8. The seat belt apparatus according to claim 7, wherein portions of the one or more wires pass through the tubular kinetic-energy absorbing member and are parallel to a direction in which the pull-in member is pulled.

9. The seat belt apparatus according to claim 1, wherein the tubular kinetic-energy absorbing member is an iron or aluminum pipe.

10. A seat belt apparatus comprising:
    a seat belt;
    a tongue connected to the seat belt;
    a buckle configured to engage the tongue releaseably;
    a pull-in member connected to the buckle;
    at least one pretensioner for pulling the pull-in member to tension the seat belt during an emergency event, and
    a metallic and tubular kinetic-energy absorbing member that is configured to absorb kinetic energy of the pull-in member when the pull-in member reaches a bottom position,
    wherein the tubular kinetic-energy absorbing member has two ends and comprises an outer peripheral wall of constant thickness around a passage of constant area along a longitudinal direction of the kinetic-energy absorbing member when in an undeformed state, and
    wherein the outer peripheral wall of constant thickness is a wall thin enough to gradually depress and deform when absorbing the kinetic-energy of the pull-in member in a deformed and wherein both ends of the absorbing member are free and not fixed.

11. A vehicle comprising:

a seat; and a seat belt apparatus configured to restrain an occupant sitting on the seat during an emergency event, the seat belt apparatus comprising:

a seat belt;

a pull-in member;

at least one pretensioner for pulling the pull-in member to tension the seat belt during an emergency event, and a metallic and tubular kinetic-energy absorbing member that is configured to absorb -kinetic energy of the pull-in member when the pull-in member reaches a bottom position, wherein the tubular kinetic-energy absorbing member has two ends and comprises an outer peripheral wall of constant thickness around a passage of constant area along a longitudinal direction of the kinetic-energy absorbing member when in an undeformed state, and wherein the outer peripheral wall of constant thickness is a wall thin enough to gradually depress and deform when absorbing the kinetic-energy of the pull-in member in a deformed state; and wherein both ends of the absorbing member are free and not fixed.

12. The vehicle according to claim 11, further comprising:

a peripheral member provided around the pull-in member, wherein the peripheral member is influenced by the pulling of the pull-in member.

13. The vehicle according to claim 11, wherein the metallic and tubular kinetic-energy absorbing member is composed of iron or aluminum.

14. The vehicle according to claim 11, wherein the pull-in member is a buckle.

15. The vehicle according to claim 11, wherein the pull-in member is a lap anchor.

* * * * *